(12) United States Patent
Ookawa et al.

(10) Patent No.: US 9,893,566 B2
(45) Date of Patent: Feb. 13, 2018

(54) POWER SUPPLY SYSTEM

(71) Applicant: Yazaki Corporation, Tokyo (JP)

(72) Inventors: Masamitsu Ookawa, Yokosuka (JP);
Shingo Tanaka, Yokosuka (JP);
Noritaka Taguchi, Yokosuka (JP)

(73) Assignee: Yazaki Corporation, Tokyo (JP)

( * ) Notice: Subject to any disclaimer, the term of this patent is extended or adjusted under 35 U.S.C. 154(b) by 485 days.

(21) Appl. No.: 14/492,770

(22) Filed: Sep. 22, 2014

(65) Prior Publication Data

US 2015/0048689 A1 Feb. 19, 2015

Related U.S. Application Data

(63) Continuation of application No. 14/129,657, filed as application No. PCT/JP2012/066333 on Jun. 27, 2012, now abandoned.

(30) Foreign Application Priority Data

Jun. 30, 2011 (JP) .................................. 2011-145297
Jul. 25, 2011 (JP) .................................. 2011-162508

(51) Int. Cl.
*H02J 50/12* (2016.01)
*H02J 50/90* (2016.01)
(Continued)

(52) U.S. Cl.
CPC .............. *H02J 50/12* (2016.02); *B60L 3/003* (2013.01); *B60L 11/182* (2013.01); *H01F 38/14* (2013.01);
(Continued)

(58) Field of Classification Search
CPC ................................... H02J 5/005; H02J 7/025
(Continued)

(56) References Cited

U.S. PATENT DOCUMENTS

2010/0115474 A1  5/2010  Takada et al.
2010/0123452 A1  5/2010  Amano et al.
(Continued)

FOREIGN PATENT DOCUMENTS

JP  2007-317914 A  12/2007
JP  2010-028819 A   2/2010
(Continued)

OTHER PUBLICATIONS

Urano: U.S. Appl. No. 61/427,607, filed Nov. 22, 2010.*
(Continued)

*Primary Examiner* — Jared Fureman
*Assistant Examiner* — James Evans
(74) *Attorney, Agent, or Firm* — Locke Lord LLP

(57) ABSTRACT

Provided is a power supply system which can reduce a decrease in transmission efficiency caused by displacement of a power supply side coil with respect to a power reception side coil and which can supply power from a power supply unit to a power reception unit with high efficiency. A power supply part includes a power supply side helical coil (33) to which power is supplied. A power reception part includes a power reception side helical coil (51) which electromagnetically-resonates with the power supply side helical coil (33) and receives power from the power supply side helical coil (33). Impedances of the power supply part and the power reception part are matched at position where center axes (Z1, Z2) of the power supply side helical coil (33) and the power reception side helical coil (51) are displaced with respect to each other.

2 Claims, 11 Drawing Sheets

(51) Int. Cl.
  *H02J 5/00* (2016.01)
  *H01F 38/14* (2006.01)
  *H02J 7/02* (2016.01)
  *B60L 3/00* (2006.01)
  *B60L 11/18* (2006.01)

(52) U.S. Cl.
  CPC .............. *H02J 5/005* (2013.01); *H02J 7/025* (2013.01); *H02J 50/90* (2016.02); *B60L 2210/30* (2013.01); *B60L 2210/40* (2013.01); *B60L 2270/147* (2013.01); *Y02T 10/7005* (2013.01); *Y02T 10/7072* (2013.01); *Y02T 10/7241* (2013.01); *Y02T 90/122* (2013.01); *Y02T 90/127* (2013.01); *Y02T 90/14* (2013.01)

(58) Field of Classification Search
  USPC .......................................................... 307/104
  See application file for complete search history.

(56) References Cited

U.S. PATENT DOCUMENTS

| | | | |
|---|---|---|---|
| 2010/0164295 A1 | 7/2010 | Ichikawa et al. | |
| 2011/0080052 A1 | 4/2011 | Sato | |
| 2011/0187321 A1 | 8/2011 | Hirayama | |
| 2011/0266882 A1* | 11/2011 | Yamamoto | H02J 50/10 307/104 |
| 2012/0161533 A1* | 6/2012 | Urano | H02J 17/00 307/104 |
| 2012/0306262 A1 | 12/2012 | Taguchi | |
| 2012/0306265 A1* | 12/2012 | Yamamoto | B60L 5/005 307/9.1 |
| 2013/0257370 A1* | 10/2013 | Ichikawa | H02J 5/005 320/108 |

FOREIGN PATENT DOCUMENTS

| | | |
|---|---|---|
| JP | 2010-068632 A | 3/2010 |
| JP | 2010-287662 A | 12/2010 |
| JP | 2011-083078 A | 4/2011 |
| JP | 2012-138976 A | 7/2012 |
| JP | 2012-248747 A | 12/2012 |
| WO | WO-2010/030005 A1 | 3/2010 |
| WO | WO-2010/036980 A1 | 4/2010 |
| WO | WO-2010/090539 A1 | 8/2010 |

OTHER PUBLICATIONS

Notification of Reasons for Refusal dated Oct. 6, 2015, issued for Japanese patent application No. 2011-162508 and English translation thereof.
Supplementary Partial European Search Report dated Apr. 8, 2016, issued for the European patent application No. 12804090.4.
Office Action dated Mar. 10, 2015, issued for the Japanese patent application No. 2011-162508 and English translation thereof.
Office Action dated Mar. 10, 2015, issued for the Japanese patent application No. 2011-145297 and English translation thereof.
Andre Kurs et al., "Wireless Power Transfer via Strongly Coupled Magnetic Resonances," Science, Jul. 6, 2007, vol. 317, pp. 83-86.
Marin Soljacic et al., "Wireless technology developed to transmit power lights up a 60W bulb in tests", Nikkei Electronics, Dec. 3, 2007, No. 966, pp. 117-128 and information sheets (4 sheets).
International Search Report dated Sep. 11, 2012, issued for PCT/JP2012/066333.
Office Action dated Jun. 18, 2015, issued for the corresponding Chinese patent application No. 201280032574.6 and English translation thereof.
Supplementary European Search Report dated Nov. 25, 2016, issued for the European patent application No. 12804090.4.

* cited by examiner

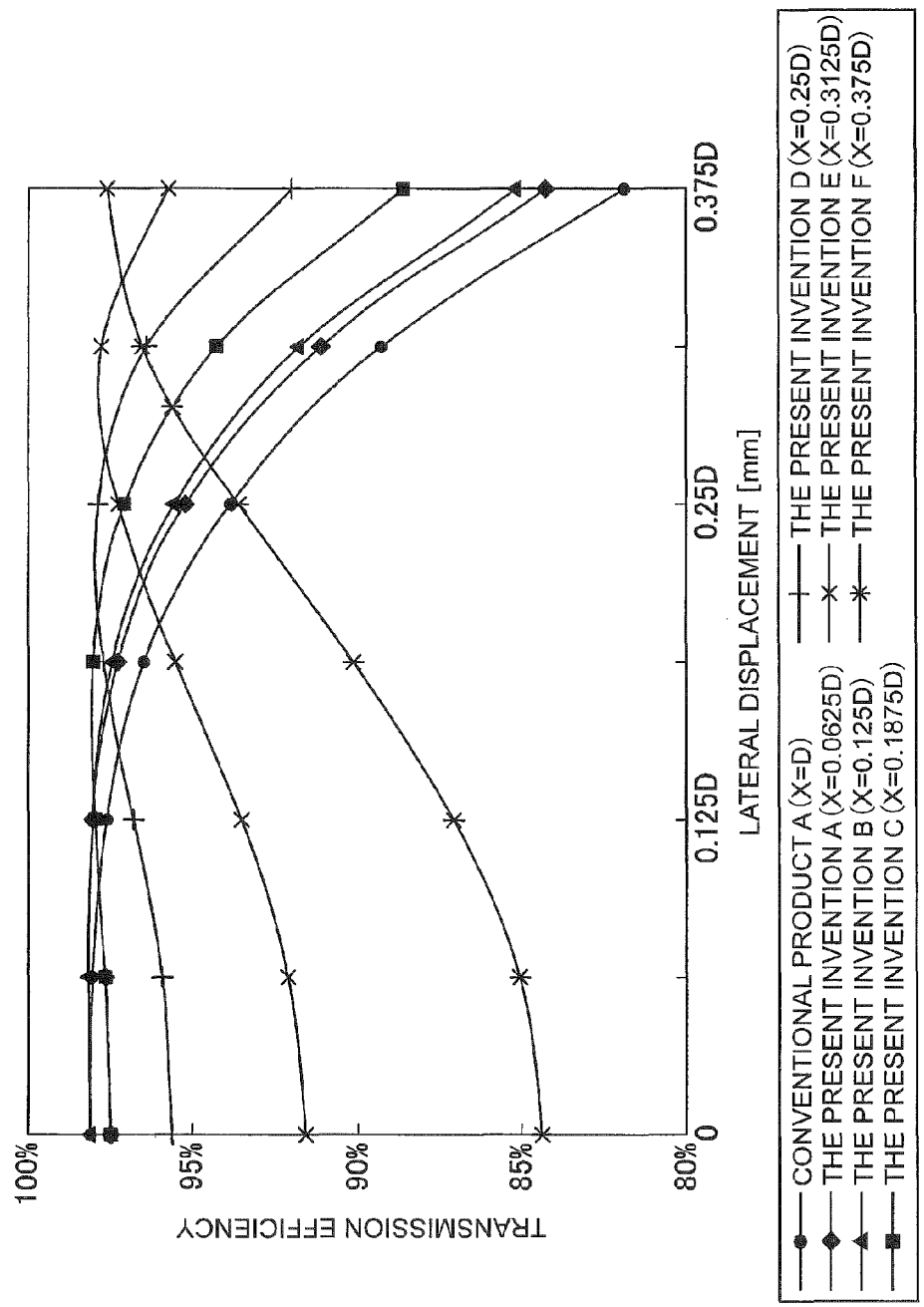

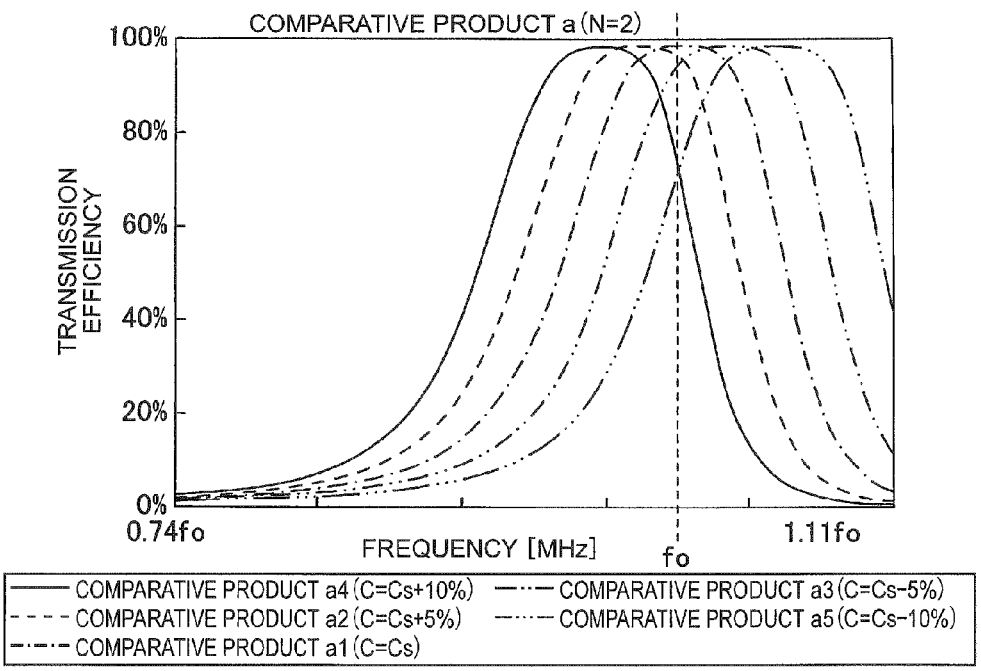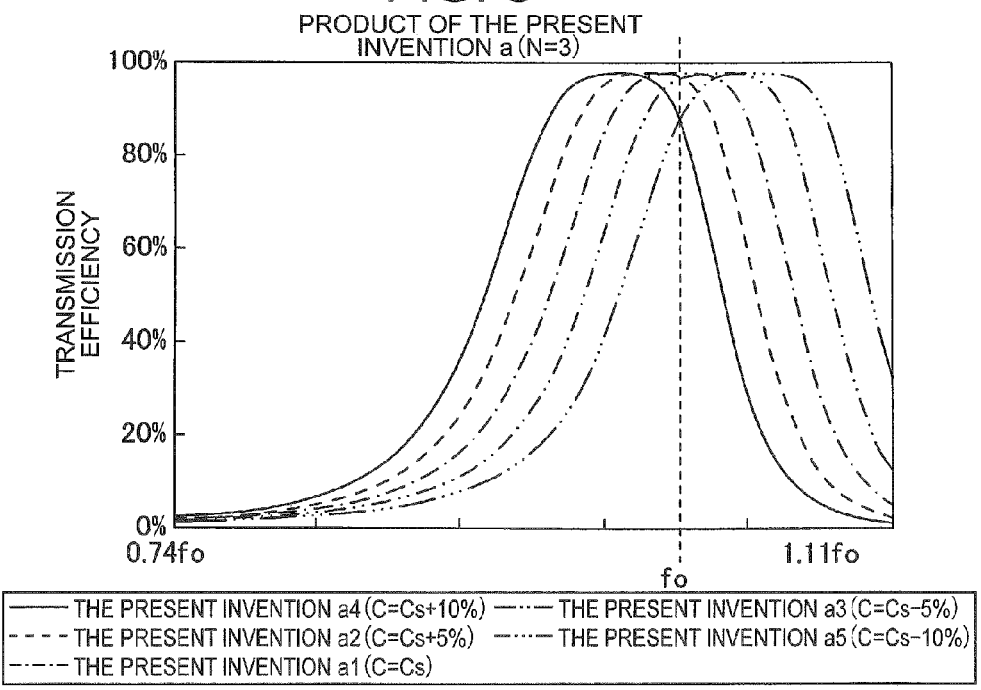

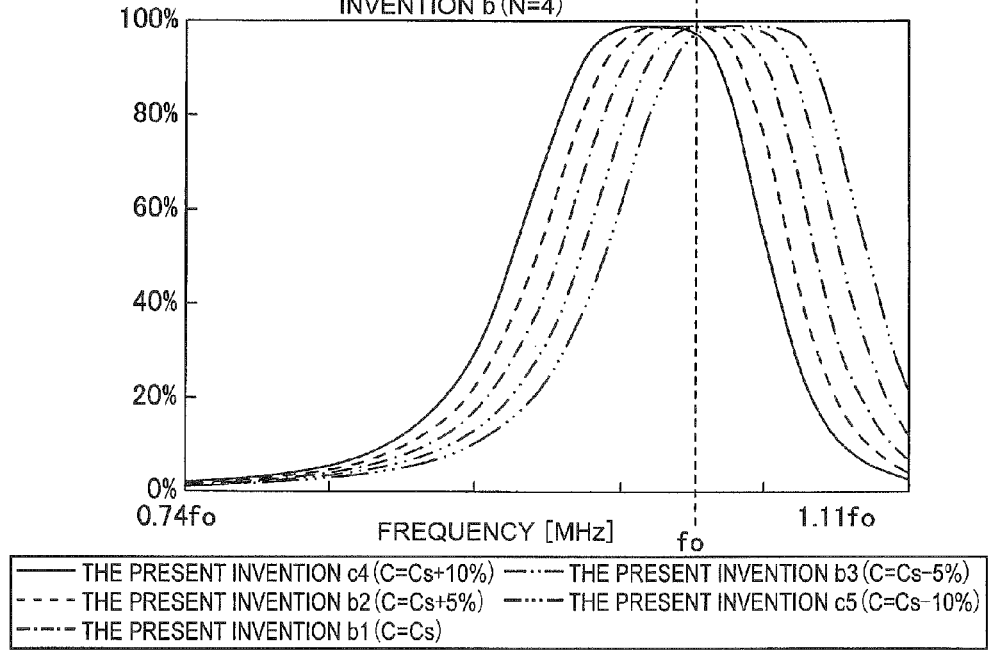
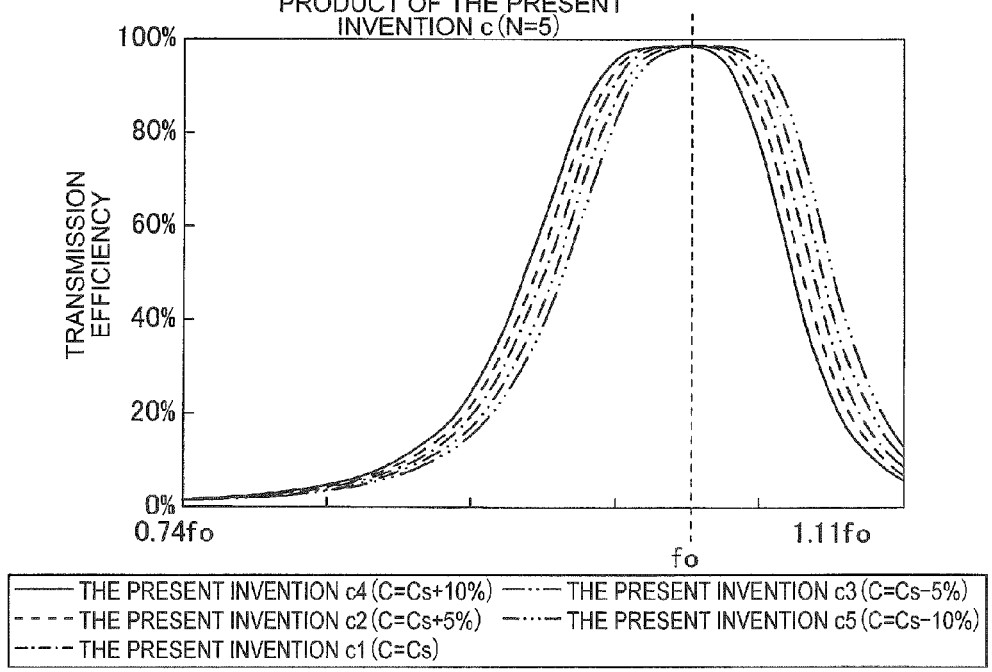

POWER SUPPLY SYSTEM

This application is a continuation application of U.S. application Ser. No. 14/129,657, filed Dec. 27, 2013 which claims the right of priority under 35 U.S.C. §119 based on Japanese Patent Application Nos. 2011-145297 and 2011-162508 filed Jun. 30, 2011 and Jul. 25, 2011, respectively.

TECHNICAL FIELD

The present invention relates to a power supply system, specifically to a power supply system supplying electric power in a non-contact fashion from a power supply side coil to a power reception side coil.

BACKGROUND ART

FIG. 15 shows a known example of such power supply system (refer for example to Literatures 1 and 2). As shown in FIG. 15, a power supply system 1 includes a power supply part 3 as a power supply unit and a power reception part 5 as a power reception unit. The power supply part 3 includes a power supply side loop antenna 32 to which power is supplied and a power supply side helical coil 33 as a power supply side coil electromagnetically-coupled to the power supply side loop antenna 32 and arranged apart from and opposed to the power supply side loop antenna 32 along a center axis direction of the power supply side loop antenna 32.

The power reception part 5 includes a power reception side helical coil 51 as a power reception side coil arranged apart from and opposed to the power supply side helical coil 33 along a center axis direction of the power supply side helical coil 33 for electromagnetic resonance, and a power reception side loop antenna 52 arranged apart from and opposed to the power reception side helical coil 51 along a center axis direction of the power reception side helical coil 51 and electromagnetically-coupled to the power reception side helical coil 51. Once power is transmitted to the power supply side helical coil 33, then this power is transmitted wirelessly to the power reception side helical coil 51 through electromagnetic resonance.

Once the power is transmitted to e power reception side helical coil 51, this power is transmitted to the power reception side loop antenna 52 through electromagnetic induction and supplied to a load such as a battery connected to the power reception side loop antenna 52. According to the above-mentioned power supply system 1, the power can be supplied in a non-contact faction from the power supply side to the power reception side through electromagnetic resonance between the power supply side helical coil 33 and the power reception side helical coil 51.

Furthermore, by providing the power reception part 5 to a motor vehicle 4 and providing the power supply part 3 to a road 2 and such, the power can be supplied to a battery mounted to the motor vehicle 4 in a wireless fashion by using the power supply system 1 described above.

In the power supply system 1, the impedance of the power supply part 3 and the power reception part 5 is adjusted (i.e. the impedance of the power supply part 3 and the power reception part 5 is matched) such that the best transmitting efficiency is obtained under a condition in which a center axis Z1 of the power supply side helical coil 33 and a center axis Z2 of the power reception side helical coil 51 are aligned in a line with a lateral displacement x=0.

However, in the power supply system 1 described above, it is difficult to stop the motor vehicle 4 such that the center axis Z1 of the power supply side helical coil 33 and the center axis Z2 of the power reception side helical coil 51 are coaxially-positioned. Thus, as shown in FIG. 15, the lateral displacement x (>0) of the center axis Z1 with respect to the center axis Z2 may be formed.

For the power supply system 1 according to the conventional product shown in FIG. 15 in which the impedances of the power supply part 3 and the power reception part 5 are matched in a state in which the lateral displacement between the center axes Z1, Z2 is x=0, the inventors simulated the transmission efficiency for the lateral displacement x ranging from 0 to 0.375D (D=the diameter of the power supply side helical coil 33 and the power reception side helical coil 5. The result is plotted with black circles in FIG. 4.

As shown in FIG. 4, there is a problem that, while the transmission efficiency is about 98% when the lateral displacement x is equal to 0, the transmission efficiency is decreased to 82% when the lateral displacement x is 0.375D.

Furthermore, as shown in FIG. 16, another power supply system 1 has a capacitor C1, C2 connected to both ends of the power supply side helical coil 33 and the power reception side helical coil 51. The capacitors C1, C2 are provided for adjusting the resonant frequency and are set to a value which can obtain the desired resonant frequency f0 in accordance with the number of turns N in the power supply side helical coil 33 and the power reception side helical coil 51. In general, in this power supply system 1 provided with the capacitors C1, C2, the power supply side helical coil 31 and the power reception side helical coil 51 have the number of turns equal to 1.

However, in the above-mentioned power supply system 1 of the conventional product, there is a problem that, depending on a product, the transmission efficiency at the resonance frequency f0 is decreased. The inventors explored the cause of such. problem and found out that such problem is caused by the variations in the capacitors C1, C2. In general, it is guaranteed that a commercial capacitor has the capacitance of about plus or minus 5% to about plus or minus 10%. Thus, the variation in the capacitors C1, C2 is expected to be within this range. FIG. 17 shows the result of the simulation of the transmission efficiency around the resonance frequency f0 when the capacitance of the capacitors C1, C2 varies for plus or minus 5% and plus or minus 10%.

As can be seen in FIG. 17, the transmission efficiency at the resonant frequency f0 is equal to or greater than 90% for the conventional product a1 in which the capacitance C of the capacitors C1, C2 is a desired capacitance Cs with no error, and for the conventional products a2, a3 having the error of no more than about plus or minus 5%. On the other hand, the transmission efficiency at the resonant frequency f0 is decreased to about 50% for the conventional products a4, a5 having the error of plus or minus 10%.

CITATION LIST

Literature 1: A. Kurs, A. Karalis, R. Moffatt, J. D. Joannopoulous, P. Fisher, M. Soljacic, "Wireless power transfer via strongly coupled magnetic resonances", Science, Vol. 317, pp. 83-86, Jul. 6, 2007

Literature 2: M. Soljacic, A. Karalis, J. Jonnopoulos, A. Kurs, R. Moffatt, P. fisgeR, "Development of technology for wireless power transfer—Lighting up 60 W bulb in experiment", Nikkei Electronics, 3 Dec. 2007

SUMMARY OF INVENTION

Object of the Invention

An object of the present invention is to provide a power supply system which can reduce a decrease in transmission efficiency caused by a lateral displacement of a power supply side coil with respect to a power reception side coil and which can thus supply power with high efficiency from a power supply unit to a power reception unit.

Furthermore, another object of the present invention is to provide a power supply system which can reduce a decrease in transmission efficiency caused by variations in capacitors.

Solution to Problem

In order to achieve the above-described object, the present invention provides, in a first aspect, a power supply system including: a power supply unit including a power supply side coil to which electric power is supplied and a power reception unit including a power reception side coil arranged to electromagnetically resonate with the power supply side coil and receive the electric power from the power supply side coil, wherein impedances of the power supply unit and the power reception unit are matched at a position where a center axis of the power supply side coil is displaced with respect to a center axis of the power reception side coil.

In order to achieve the above-described object, the present invention provides, in a second aspect, the power supply system described above, wherein the power supply side coil and the power reception side coil are wound into a circular shape.

In order to achieve the above-described object, the present invention provides, in a third aspect, a power supply system including: a power supply side coil to which electric power is supplied; a power reception side coil arranged to electromagnetically resonate with the power supply side coil and receive the electric power from the power supply side coil; and a capacitor for adjustment of resonance frequency connected to both ends of each of the power supply side coil and the power reception side coil, wherein number of turns of the power supply side coil and the power reception side coil is at least 3 turns but no more than 6 turns.

In order to achieve the above-described object, the present invention provides, in a fourth aspect, the power supply system described above, wherein the number of turns of the power supply side coil and the power reception side coil is at least 3 turns but no more than 5 turns.

Advantageous Effects of Invention

As explained above, according to the invention described in the first aspect, impedances of the power supply unit and the power reception unit are matched at the position where the center axis of the power supply side coil is displaced with respect to the center axis of the power reception side coil. Thus, a decrease in transmission efficiency caused by a lateral displacement between the power supply side coil and the power reception side coil can be reduced, and power can be supplied with high efficiency from the power supply unit to the power reception unit.

According to the invention described in the second aspect, since the power supply side coil and the power reception side coil are wound into the circular shape, anisotropy in the transmission efficiency can be eliminated.

According to the invention described in the third aspect, the number of turns of the power supply side coil and the power reception side coil is at least 3 turns but no more than 6 turns. Thus, the transmission efficiency at a desired resonance frequency can be equal to or greater than 80% even if there is error in capacitance of the capacitors of up to ±10%, thereby reducing a decrease in the transmission efficiency caused by the variation in the capacitors.

According to the invention described in the fourth aspect, the number of turns of the power supply side coil and the power reception side coil is at least 3 turns but no more than 5 turns. Thus, the transmission efficiency at a resonance frequency can be equal to or great than 60% even if there is a positional displacement of 0.5D (D is a diameter of the power supply side coil and the power reception side coil).

BRIEF DESCRIPTION OF DRAWINGS

FIG. 4 is a graph showing transmission efficiencies for displacement between center axes Z1, Z2 ranging from 0 to 0.375D, for a conventional product in which the impedances of a power supply part and a power reception part are matched when the lateral displacement x between the center axes is x=0, and for respective products A through F according to the present invention in which the impedances of a power supply part and a power reception part are matched when the lateral displacement x between the center axes is equal to 0.0625D, 0.125D, 0.1875D, 0.25D, 0.3125D and 0.375D;

FIG. 7 is a graph showing simulation results of transmission efficiency at resonant frequency f0 for comparative products "a" which are power supply systems with N=2, wherein a comparative product a1 has C=Cs, comparative products a2, a3 have C=Cs±5% and comparative products a4, a5 have C=Cs±10%;

FIG. 8 is a graph showing simulation results of transmission efficiency at resonant frequency f0 for products of the present invention "a" which are power supply systems with N=3, wherein a product of the present invention a1 has C=Cs, products of the present invention a2, a3 have C=Cs±5% and products of the present invention a4, a5 have C=Cs±10%;

FIG. 9 is a graph showing simulation results of transmission efficiency at resonant frequency f0 for products of the present invention "b" which are power supply systems with N=4, wherein a product of the present invention b1 has C=Cs, products of the present invention b2, b3 have C=Cs±5% and products of the present invention b4, b5 have C=Cs±10%;

FIG. 10 is a graph showing simulation results of transmission efficiency at resonant frequency f0 for products of the present invention "c" which are power supply systems with N=5, wherein a product of the present invention c1 has C=Cs, products of the present invention c2, c3 have C=Cs±5% and products of the present invention c4, c5 have C=Cs±10%;

DESCRIPTION OF EXEMPLARY EMBODIMENTS

First Embodiment

Figure 1:
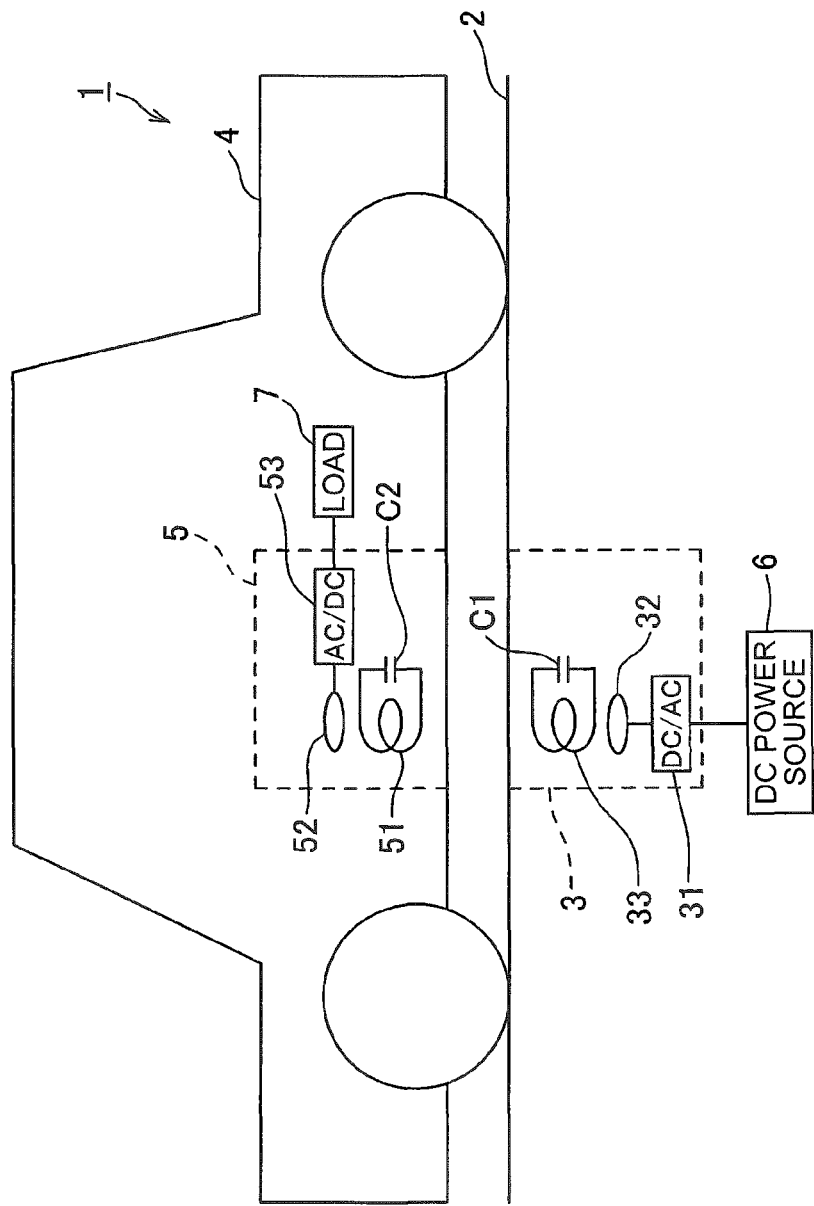
FIG. 1 shows a power supply system according to a first embodiment of the present invention.
Figure 2:
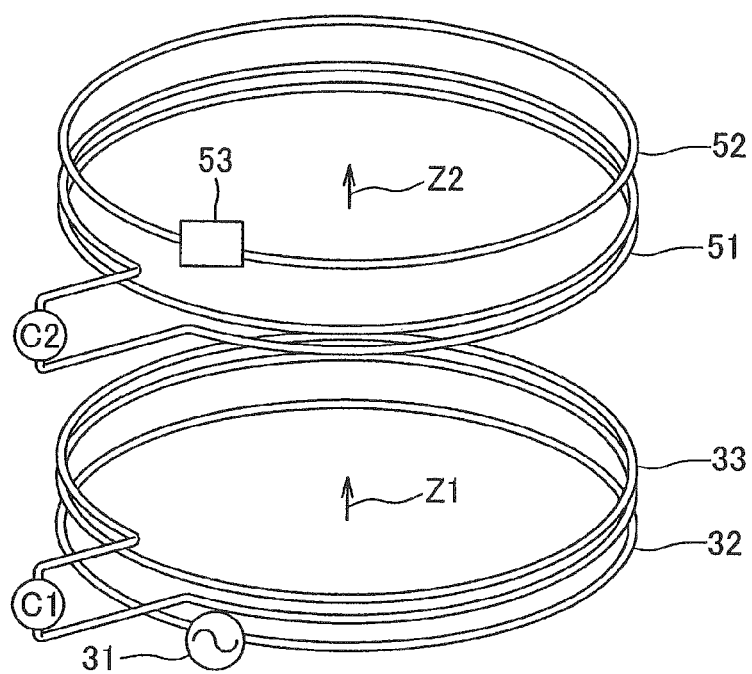
FIG. 2 is a perspective view of a power supply side loop antenna, a power supply side helical coil, a power reception side helical coil and a power reception side loop antenna constituting the power supply system of FIG. 1.

In the following, a power supply system according to a first embodiment of the present invention is explained in reference to FIG. 1 and FIG. 2. FIG. 1 shows a power supply system according to a first embodiment of the present invention. FIG. 2 is a perspective view of a power supply side loop antenna, a power supply side helical coil, a power reception side helical coil and a power reception side loop antenna constituting the power supply system of FIG. 1. As shown in these drawings, a power supply system 1 includes a power supply part 3 as a power supply unit provided on a road 2, for example, and a power reception part 5 as a power reception unit provided to a body portion of a motor vehicle 4, for example.

The power supply part 3 includes a DC/AC converter 31 which converts direct current power (DC power) supplied from a DC power source into alternating current power (AC power), a power supply side loop antenna 32 to which the AC power converted by the DC/AC converter 31 is supplied, a power supply side helical coil 33 as a power supply side coil arranged apart from and opposed to the power supply side loop antenna 32 along a center axis direction of the power supply side loop antenna 32 and electromagnetically-coupled to the power supply side loop antenna 32, and a capacitor C1 connected in parallel to the power supply side helical coil 33.

The power supply side loop antenna 32 is arranged into a form of a circular loop, and a center axis of the power supply side loop antenna 32 is arranged along a direction from the road 2 toward the body portion of the motor vehicle 4, i.e. a vertical direction. The DC/AC converter 31 is connected to both ends of this power supply side loop antenna 32, so that the AC power which is converted by the DC/AC converter 31 is supplied as describe above.

The power supply side helical coil 33 is formed by a winding wire wound into a circular helical shape. In this embodiment, the number of turns of the power supply side helical coil 33 is 2 turns. The power supply side helical coil 33 is arranged on the side of the power supply side loop antenna 32 adjacent to the motor vehicle 4 and arranged coaxially with the power supply side loop antenna 32. The power supply side loop antenna 32 and the power supply side helical coil 33 are spaced from each other within the range that the power supply side loop antenna 32 and the power supply side helical coil 33 will be electromagnetically-coupled to each other, i.e. within the range that electromagnetic induction is induced at the power supply side helical coil 33 when the AC power is supplied to the power supply side loop antenna 32 and the alternating current flows in the power supply side loop antenna 32. The capacitor C1 is provided to adjust the resonant frequency.

The power reception part 5 includes a power reception side helical coil 51 as a power reception side coil arranged to electromagnetically resonate with the power supply side helical coil 33, a power reception side loop antenna 52 arranged opposed to the power reception side helical coil 51 along a center axis direction of the power reception side helical coil 51 and electromagnetically-coupled to the power reception side helical coil 51, an AC/DC converter 53 converting the AC power received by the power reception side loop antenna 52 into DC power, and a capacitor C2 connected in parallel to the power reception side helical coil 51.

A load 7 such as a battery is connected to the power reception side loop antenna 52 via the AC/DC converter 53. The power reception side loop antenna 52 is arranged into a form of a circular loop, and a center axis of the power reception side loop antenna 52 is arranged along a direction from the body portion of the motor vehicle 4 toward the road 2, i.e. a vertical direction. In this embodiment, as shown in FIG. 2, the power reception side loop antenna 52 has the same diameter as the above-described power reception side loop antenna 32. However, the present invention is not limited to this, and the diameter of the power reception side loop antenna 52 may be smaller than the diameter of the power reception side loop antenna 32.

The power reception side helical coil 51 is formed by a winding wire wound into a circular helical shape. In this embodiment, the number of turns of the power reception side helical coil 51 is 2 turns, as the power supply side helical coil 33. The power reception side helical coil 51 has the same diameter as the power supply side helical coil 33. However, the present invention is not limited to this, and the diameter of the power reception side helical coil 51 may be smaller than the diameter of the power supply side helical coil 33.

The power reception side helical coil 51 is arranged on the side of the power reception side loop antenna 52 adjacent to the road 2 and arranged coaxially with the power reception side loop antenna 52. Thus, the power reception side loop antenna 52 and the power reception side helical coil 51 are spaced from each other within the range that the power reception side loop antenna 52 and the power reception side helical coil 51 will be electromagnetically-coupled to each other, i.e. within the range that the induction current is induced at the power reception side loop antenna 52 when the alternating current flows in the power reception side helical coil 51. Similar to the capacitor C1, the capacitor C2 is provided for adjustment of resonant frequency. The capacitance of these capacitors C1, C2 is adjusted in advance so that the resonant frequency of the power supply side helical coil 33 and the power reception side helical coil 51 is a desired frequency f0 (e.g. 10 MHz).

According to the power supply system 1 described above, when the power reception part 5 of the motor vehicle 4 is moved toward the power supply part 3, and the power supply side helical coil 33 and the power reception side helical coil 51 are positioned oppositely along the center axis direction with a space between each other, the power supply side helical coil 33 and the power reception side helical coil 51 electromagnetically resonate with each other, thereby supplying power in a non-contact fashion from the power supply part 3 to the power reception part 5.

To be more specific, when the AC power is supplied to the power supply side loop antenna 32, this AC power is transmitted to the power supply side helical coil 33 through electromagnetic induction. In other words, the power is fed to the power supply side helical coil 33 through the power supply side loop antenna 32. When the power is transmitted to the power supply side helical coil 33, this power is transmitted wirelessly to the power reception side helical coil 51 through magnetic-field resonance. Furthermore, when the power is transmitted to the power reception side helical coil 51, thus power is transmitted to the power reception side loop antenna 52 through electromagnetic induction and supplied to the load 7 connected to this power reception side loop antenna 52 through the AC/DC converter 53.

Figure 3A:
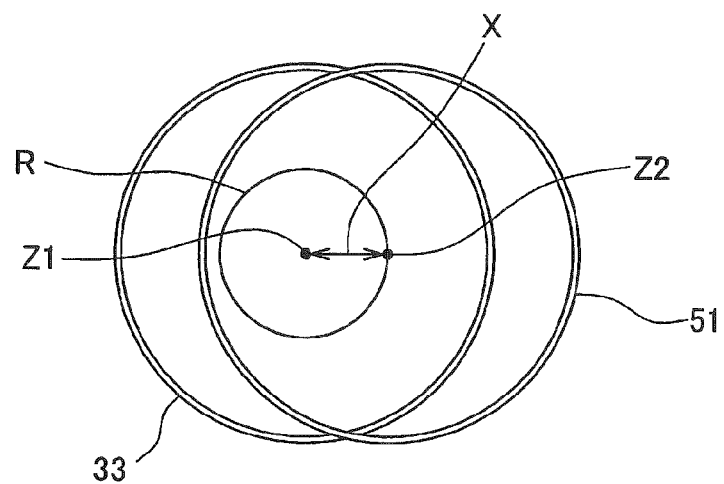
FIG. 3A illustrates a position which provides best transmission efficiency according to the present invention.

As shown in FIG. 3A, in the power supply system 1, the impedances of the power supply part 3 and the power reception part 5 are adjusted (i.e. the impedances of the power supply part 3 and the power reception part 5 are matched) so as to make the transmission efficiency to be greatest at the position where the center axes Z1, Z2 of the power supply side helical coil 33 and the power reception side helical coil 51 are laterally displaced for x (>0). This lateral displacement x between the center axes Z1, Z2 is within a range that the power supply side helical coil 33 and the power reception side helical coil 51 overlap one another in the center axis direction.

For example, a method for matching impedances of the power supply part 3 and the power reception part 5 includes, providing matching devices on both sides of the power supply side helical coil 33 and the power reception side helical coil 51, or of the power supply side loop antenna 32 and the power reception side loop antenna 52, and adjusting the impedance using this matching device, or adjusting the impedances of the DC/AC converter 31 and the AC/DC converter 53.

Figure 3B:
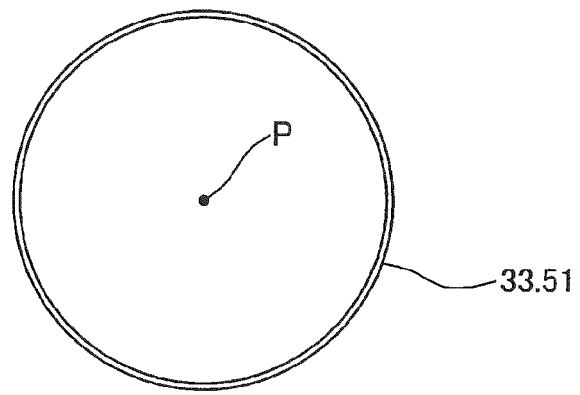
FIG. 3B illustrates a position which provides best transmission efficiency according to a conventional art.

Referring to FIG. 3B, when the impedances of the power supply part 3 and the power reception part 5 are matched at a position where the lateral displacement x between the center axes Z1, Z2 is x=0, as is the case of the conventional art, the transmission efficiency becomes greatest at a point P on the center axis Z1, and the transmission efficiency decreases as the center axis Z2 of the power reception side helical coil 51 moves away from the point P.

In contrast, referring back to FIG. 3A, when the impedances of the power supply part 3 and the power reception part 5 are matched at the position where the center axes Z1, Z2 of the power supply side helical coil 33 and the power reception side helical coil 51 are displaced for x, the transmission efficiency becomes greatest on a circle R with a radius of x centered at the center axis Z1, and the transmission efficiency decreases as the center axis Z2 of the power reception side helical coil 51 moves away from the circle R. It is clear from FIG. 3A and FIG. 3B that, in the conventional art the transmission efficiency is greatest only at the point P, while in the present embodiment the transmission efficiency is greatest at points on the circle R. Thus, the decrease in the transmission efficiency caused by the positional displacement x of the power supply side helical coil 33 with respect to the power reception side helical coil 51 can be reduced, thereby supplying the power from the power supply part 3 to the power reception part 5 with high efficiency.

Next, the inventors of the present invention have simulated the transmission efficiency for the lateral displacement between the center axes Z1, Z2 ranging from 0 to 0.375D, for a conventional product in which the impedances of the power supply side helical coil 33 and the power reception side helical coil 51 are matched when the lateral displacement x between the center axes Z1, Z2 is x=0, as shown in FIG. 3B, and for respective products of the present invention A through F in which the impedances of the power supply side helical coil 33 and the power reception side helical coil 51 are matched when the lateral the displacement x between the center axes Z1, Z2 is equal to 0.0625D, 0.125D, 0.1875D, 0.25D, 0.3125D and 0.375D. The results are shown in FIG. 4.

As shown in FIG. 4, for the conventional product, the transmission efficiency at the lateral displacement x=0 is 98%, but is decreased to 82% at the lateral displacement x=0.375D. In contrast, for the products A, B of the present invention in which the impedances are matched at the lateral displacement x=0.0625D, 0.125D, the transmission efficiency at the lateral displacement x=0.375D is about 85%, i.e. the decrease in the transmission efficiency at x=0.375D can be reduced. Furthermore, for the product C of the present invention in which the impedances are matched at the lateral displacement x=0.1875D, the transmission efficiency at the lateral displacement x=0 is 97.5%, i.e. the transmission efficiency is slightly decreased, but the transmission efficiency at the lateral displacement x=0.375D is about 89%, i.e. the decrease in the transmission efficiency at x=0.375D can be reduced.

Furthermore, for the product D of the present invention in which the impedances are matched at the lateral displacement x=0.25D, the transmission efficiency at the lateral displacement x=0 is 95.5%, but the transmission efficiency at the lateral displacement x=0.375D is about 92%, i.e. the decrease in the transmission efficiency at x=0.375D can be reduced significantly. Furthermore, for the product E of the present invention in which the impedances are matched at the lateral displacement x=3125D, the transmission efficiency at the lateral displacement x=0 is decreased to 91%, but the transmission efficiency at the lateral displacement x=0.375D can be increased to 96%.

Furthermore, for the product F of the present invention in which the impedances are matched at the lateral displacement x=0.375D, the transmission efficiency at the lateral displacement x=0 is decreased to 84%, but the transmission efficiency at the lateral displacement x=0.375D can be increased to 98%. Thus, it is clear from the above results that, in the conventional product, the transmission efficiency is decreased to 82% when there is the lateral displacement x in a range from 0 to 0.375D, whereas the products A through F of the present invention can achieve the transmission efficiency of 84% or higher even if there is the lateral displacement x in a range from 0 to 0.375D. Thus, it is found that the products of the present invention reduces the decrease in the transmission efficiency caused by the lateral displacement, thus can supply power from the power supply part 3 to the power reception part 5 with high efficiency.

Furthermore, according to the embodiment described above, since the power supply side helical coil 33 and the power reception side helical coil 51 are wound into a circular shape, the anisotropy in the transmission efficiency can be eliminated.

In the above-described embodiment, the power supply side helical coil 33 and the power reception side helical coil 51 are wound into a circular shape; however the present invention is not limited to this. The shape of the power supply side helical coil 33 and the power reception side helical coil 51 can be the shape other than a circle such as a rectangle or a triangle.

Second Embodiment

Figure 5:
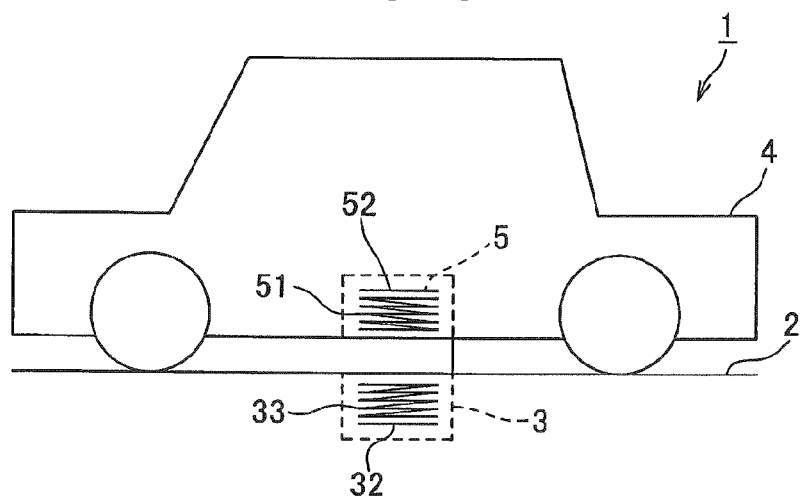
FIG. 5 shows a power supply system according to a second embodiment of the present invention.
Figure 6:
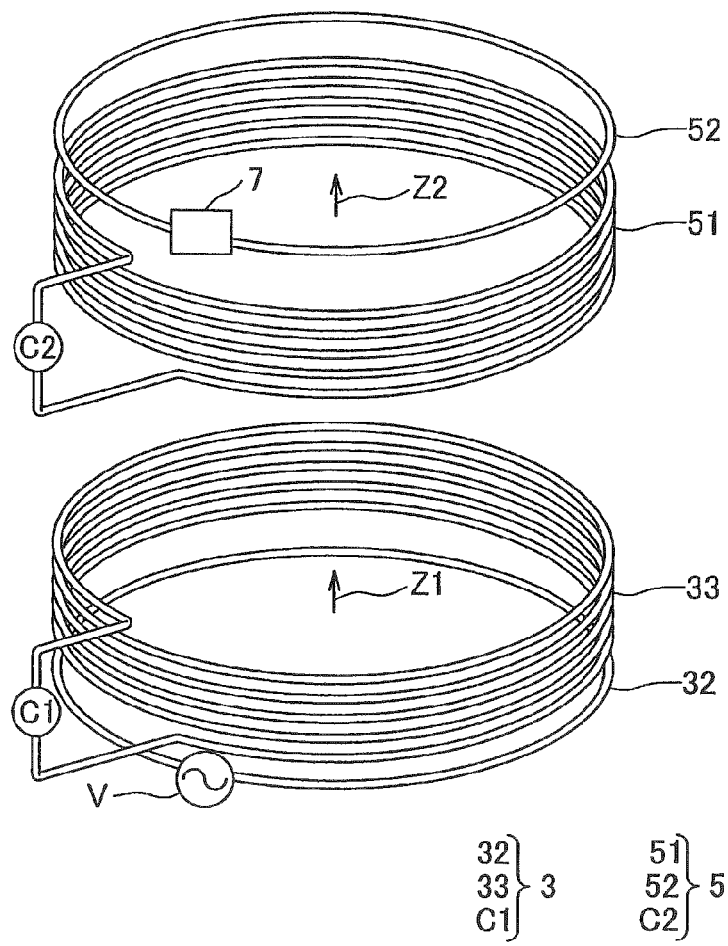
FIG. 6 is a perspective view of a power supply side loop antenna, a power supply side helical coil, a power reception side helical coil and a power reception side loop antenna constituting the power supply system of FIG. 5.

In the following, a power supply system according to a second embodiment of the present invention is explained in reference to FIG. 5 and FIG. 6. FIG. 5 shows a power supply system according to a second embodiment of the present invention. FIG. 6 is a perspective view of a power supply side loop antenna, a power supply side helical coil, a power reception side helical coil and a power reception side loop antenna constituting the power supply system of FIG. 5. As shown in these drawings, a power supply system 1 includes a power supply part 3 provided on a road 2, for example, and a power reception part 5 provided to a body portion of a motor vehicle 4, for example.

The power supply part 3 includes a power supply side loop antenna 32 to which the AC power is supplied, a power supply side helical coil 33 arranged apart from and opposed to the power supply side loop antenna 32 along a center axis direction of the power supply side loop antenna 32 and electromagnetically-coupled to the power supply side loop antenna 32, and a capacitor C1 (see FIG. 6) connected to both ends of the power supply side helical coil 33.

The power supply side loop antenna 32 is formed by winding a conductive wire into a form of a circular loop, and the center axis of the power supply side loop antenna 32 is arranged along a direction from the road 2 toward the body portion of the motor vehicle 4, i.e. a vertical direction. An AC power source V is connected to both ends of this power supply side loop antenna 32 to supply AC power from the AC power source.

The power supply side helical coil 33 is formed by a conductive wire wound into a circular helical shape. In the examples shown in FIG. 5 and FIG. 6, the number of turns of the power supply side helical coil 33 is 5 turns. However, in the second embodiment, the number of turns is not limited to this, and can be between 3 turns to 6 turns. As shown in FIG. 6, the capacitor C1 for adjustment of resonant frequency is connected to both ends of the power supply side helical coil 33.

The power supply side helical coil 33 is arranged on the side of the power supply side loop antenna 32 adjacent to the motor vehicle 4 and arranged coaxially with the power supply side loop antenna 32. The power supply side loop antenna 32 and the power supply side helical coil 33 are spaced from each other within the range that the power supply side loop antenna 32 and the power supply side helical coil 33 will be electromagnetically-coupled to each other, i.e. within the range that electromagnetic induction is induced at the power supply side helical coil 33 when the AC power is supplied to the power supply side loop antenna 32 and the alternating current flows in the power supply side loop antenna 32.

The power reception part 5 includes a power reception side helical coil 51 arranged to electromagnetically resonate with the power supply side helical coil 33 when positioned oppositely along a center axis direction of the power supply side helical coil 33 with a space with respect to the power supply side helical coil 33, a power reception side loop antenna 52 arranged opposed to the power reception side helical coil 51 along the center axis direction of the power reception side helical coil 51 and electromagnetically-coupled to the power reception side helical coil 51, and a capacitor C2 connected to both ends of the power reception side helical coil 51.

The power reception side loop antenna 52 is formed by winding a conductive wire into a circular loop, and a center axis of the power reception side loop antenna 52 is arranged along a direction from the body portion of the motor vehicle 4 toward the road 2, i.e. a vertical direction. A load 7 such as a battery is connected to both ends of the power reception side loop antenna 52. In this embodiment, the power reception side loop antenna 52 has the same diameter as the above-described power reception side loop antenna 32. However, the present invention is not limited to this, and the diameter of the power reception side loop antenna 52 may be smaller than the diameter of the power reception side loop antenna 32.

The power reception side helical coil 51 is formed by a conductive wire wound into a circular helical shape. In the examples shown in FIGS. 5 and 6, the number of turns N of the power reception side helical coil 51 is 5 turns as the power supply side helical coil 33. However, the present invention is not limited to this, and the number of turns can be between 3 turns to 6 turns. In this embodiment, the power reception side helical coil 51 may have the same diameter as the power supply side helical coil 33. However, the present invention is not limited to this, and the diameter of the power reception side helical coil 51 may be smaller than the diameter of the power supply side helical coil 33.

As shown in FIG. 6, the capacitor C2 for adjustment of resonant frequency is connected to both ends of the power reception side helical coil 51. The capacitors C1, C2 are provided for adjustment of resonant frequency, and the capacitance C of the power supply side helical coil 33 and the power reception side helical coil 51 is set to capacitance Cs so the resonance frequency is a desired frequency f0.

The power reception side helical coil 51 is arranged on the side of the power reception side loop antenna 52 adjacent to the road 2 and arranged coaxially with the power reception side loop antenna 52. Thus, the power reception side loop antenna 52 and the power reception side helical coil 51 are spaced from each other within the range that the power reception side loop antenna 52 and the power reception side helical coil 51 will be electromagnetically-coupled to each other, i.e. within the range that the induction current is induced at the power reception side loop antenna 52 when the alternating current flows in the power reception side helical coil 51.

According to the power supply system 1 described above, when the power reception part 5 of the motor vehicle 4 is moved toward the power supply part 3, and the power supply side helical coil 33 and the power reception side helical coil 51 are positioned oppositely along the center axis direction with a space between each other, the power supply side helical coil 33 and the power reception side helical coil 51 electromagnetically resonate with each other, thereby supplying power in a non-contact fashion from the power supply part 3 to the power reception part 5.

To be more specific, when the AC power is supplied to the power supply side loop antenna 32, this AC power is transmitted to the power supply side helical coil 33 through electromagnetic induction. In other words, the power is fed to the power supply side helical coil 33 through the power supply side loop antenna 32. When the power is transmitted to the power supply side helical coil 33, this power is transmitted wirelessly to the power reception side helical coil 51 through magnetic-field resonance. Furthermore, when the power is transmitted to the power reception side helical coil 51, thus power is transmitted to the power reception side loop antenna 52 through electromagnetic induction and supplied to the load 7 connected to this power reception side lop antenna 52.

According to the power supply system 1 described above, the number of turns of the power supply side helical coil 33 and the power reception side helical coil 51 is between 3 turns to 6 turns. Thus, even if there is error of maximum of ±10% in the capacitance of the capacitors C1, C2, the transmission efficiency at the desired resonance frequency f0 can be 80% or higher, thereby reducing the decrease in the transmission efficiency caused by variation in the capacitors C1, C2.

Next, the inventors of the present invention have simulated the transmission efficiency near the resonance frequency f0 for respective comparative products a1 through a5 which are the power supply system 1 having the number of turns of the power supply side helical coil 33 and the power reception side helical coil 51 of N=2. The comparative product a1 includes the capacitors C1, C2 having the capacitance of C=Cs with no error, the comparative products a2, a3 have C=Cs±5% with error of ±5% and the comparative products a4, a5 have C=Cs±10% with error of ±10%. The results are shown in FIG. 7.

Furthermore, to verify the effect, the inventors of the present invention have simulated the transmission efficiency near the resonance frequency f0 for respective products of the present invention a1 through c5 which are the power supply system 1 having the number of turns of the power supply side helical coil 33 and the power reception side helical coil 51 of N=3, 4, 5. The products of the present invention a1, b1, c2 include the capacitors C1, C2 having the capacitance of C=Cs with no error, the products of the present invention a2, a3, b2, b3, c2, c3 have C=Cs±5% with the error of ±5%, and the products of the present invention a4, a5, b4, b5, c4, c5 have C=Cs±10% with the error of ±10%. The results are shown in FIGS. 8 through 10.

Figure 17:
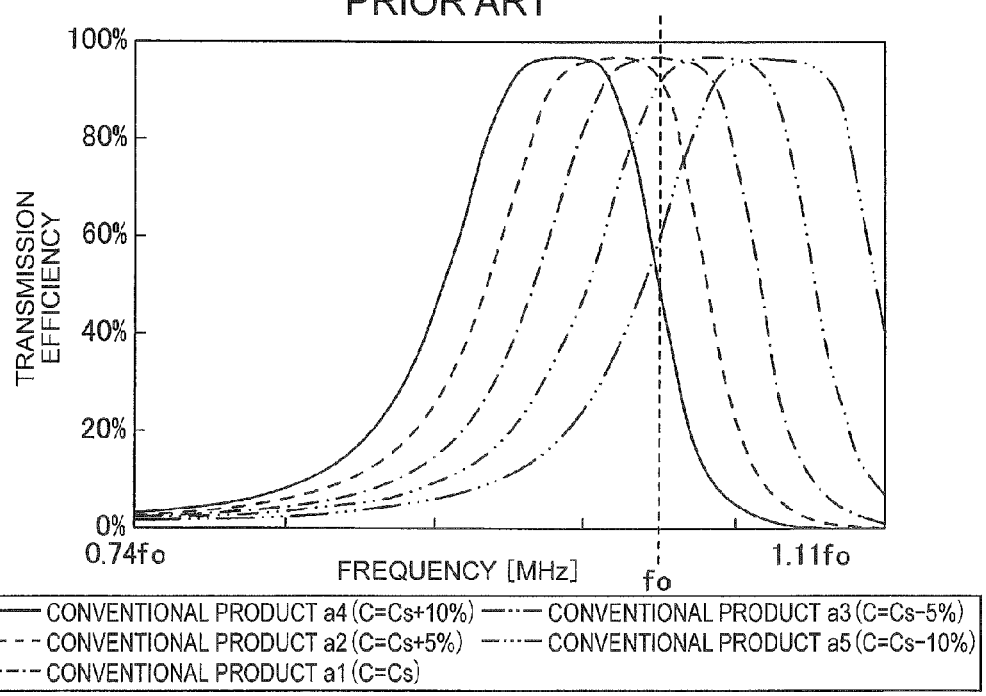
FIG. 17 is a graph showing simulation results of transmission efficiency at resonant frequency f0 for conventional products "a" which are power supply systems with N=1, wherein a conventional product a1 has C=Cs, conventional products a2, a3 have C=Cs±5% and conventional products a4, a5 have C=Cs±10%.

As shown in FIG. 17, for the conventional product a1 (N=1) with no error in the capacitance C of the capacitors C1, C2, the transmission efficiency at the resonant frequency f0 is 94%, whereas for the conventional products a2, a3 (N=1) with the error of ±5%, the transmission efficiency is about 90% which is about 4% lower. Moreover, for the conventional products a4, a5 (N=1) with large error of ±10%, the transmission efficiency is about 50% which is 44% lower.

In contrast, as shown in FIG. 7, for the comparative product a1 (N=2) with no error in the capacitance C of the capacitors C1, C2, the transmission efficiency at the resonant frequency f0 is 98%, whereas for the comparative products a2, a3 (N=2) with the error of ±5%, the transmission efficiency is 95% which is only about 3% lower, i.e. the decrease in the transmission efficiency was reduced. Moreover, for the comparative products a4, a5 (N=2) with large error of ±10%, the transmission efficiency of about 72% was ensured, that means the decrease in the transmission efficiency was reduced to about 20% compared to the conventional product a1. Thus, it was found that the transmission efficiency can be improved compared to the conventional products a4, a5.

Furthermore, as shown FIG. 8, for the product of the present invention a1 (N=3) with no error in the capacitance C of the capacitors C1, C2 and for the products of the present invention a2, a3 (N=3) with the error of ±5%, the transmission efficiency at the resonant frequency f0 was 98%. Thus, it was found that there is almost no decrease in the transmission efficiency if the error is within about ±5%. Furthermore, even for the products of the present invention a4, a5 (N=3) with the large error of ±10%, the transmission efficiency of 87% can be ensured, that means the decrease in the transmission efficiency was reduced to about 10% compared to the product of the present invention a1. Thus, it was found that the transmission efficiency can be improved compared to the conventional products a4, a5.

Furthermore, as shown in FIG. 9, for the product of the present invention b1 (N=4) with no error in the capacitance C of the capacitors C1, C2 and for the products of the present invention b2, b3 (N=4) with the error of ±5%, the transmission efficiency at the resonant frequency f0 was 98%. Thus, it was found that there is almost no decrease in the transmission efficiency if the error is about ±5%. Furthermore, even for the products of the present invention a4, a5 (N=2) with the large error of ±10%, the transmission efficiency of 96% can be ensured, that means the decrease in the transmission efficiency was reduced to about 2% compared to the product of the present invention a1. Thus, it was found that the transmission efficiency can be improved compared to the conventional products a4, a5.

Furthermore, as shown in FIG. 10, for the product of the present invention c1 (N=5) with no error in the capacitance C of the capacitors C1, C2, for the products of the present invention c2, c3 with the error in the capacitance C of the capacitors C1, C2 of ±5%, and for the products of the present invention C4, c5 with the error of ±10%, the transmission efficiency at the resonant frequency f0 was 98%. Thus, it was found that there is almost no decrease in the transmission efficiency if the error is within about ±10%.

Thus, it is clear from FIGS. 8 through 10 that, the decrease in the transmission efficiency caused by the error in the capacitance C of the capacitors C1, C2 can be reduced with the increase in the number of turns N of the power supply side helical coil 33 and the power reception side helical coil 51.

Figure 11:
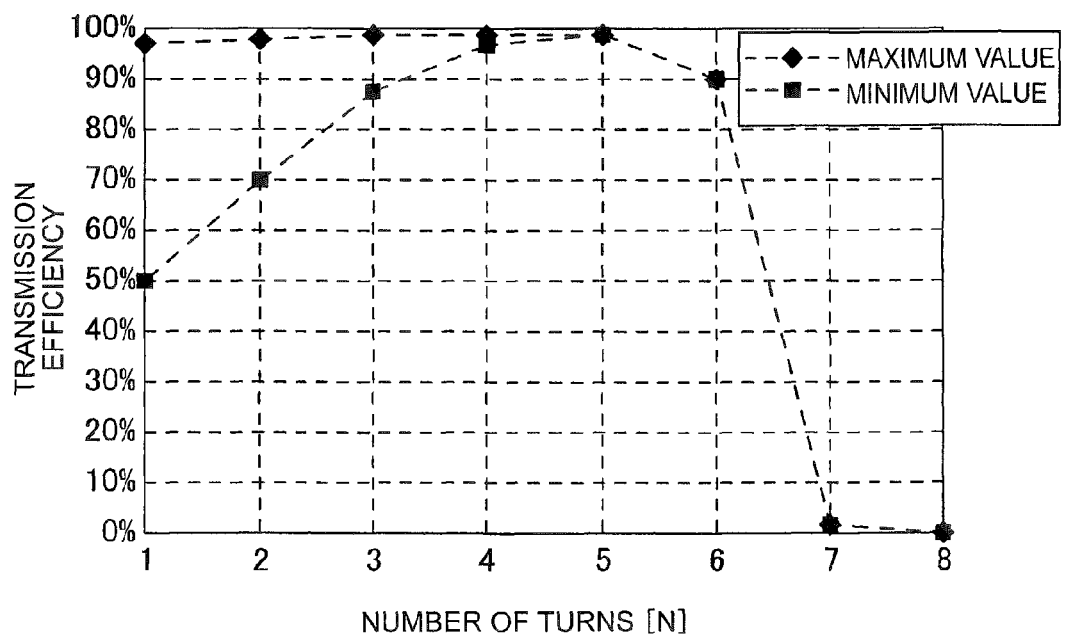
FIG. 11 is a graph showing simulation results of maximum values and minimum values of transmission efficiency near resonant frequency f0 when the number of turns of the power supply side helical coil and the power reception side helical coil is changed to 1 through 8.

Furthermore, the inventors of the present invention simulated a maximum value (i.e. a value at C=Cs) and a minimum value (i.e. a value at C=Cs±10%) of the transmission efficiency at near the resonance frequency when the number of turns N of the power supply side helical coil 33 and the power reception side helical coil 51 of the power supply system 1 shown in FIGS. 5 and 6 is changed from 1 turn to 8 turns. The results are shown in FIG. 11. It is clear from FIG. 11 that the decrease in the transmission efficiency caused by the error in the capacitance C of the capacitors C1, C2 can be reduced with the increase in the number of turns N of the capacitors C1, C2. However, when the number of turns is greater than N=6, the transmission efficiency had decreased significantly due to the change in the resonance frequency f0.

This can be explained as follows. In general, the resonance frequency f0 is expressed by the following equation (1), $$f0 = 1/(2\pi \times \mathrm{sqrt}(L \times (Cs+Cp))) \ [\mathrm{Hz}] \quad (1)$$

wherein, L=inductor of the power supply side helical coil 33 and the power reception side helical coil 51, Cs=capacitance of the capacitors C1, C2 (lumped-constant capacitance), and Cp=parasitic capacitance of the power supply side helical coil 33 and the power reception side helical coil 51.

When the number of turns N of the power supply side helical coil 33 and the power reception side helical coil 51 is increased, the parasitic capacitance Cp is increased and the inductor L is increased. As a result, the lumped-constant capacitance Cs is decreased. Thus, it is contemplated that, since the rate of contribution of the lumped-constant capacitance Cs to the resonance frequency f0 in the equation (1) is decreased, the resonance frequency f0 is no longer effected by the variation in the lumped-constant capacitance Cs.

Furthermore, it is clear from FIG. 11 that, by setting the number of turns N of the power supply side helical coil 33 and the power reception side helical coil 51 to be at least 3 turns but no more than 6 turns, the transmission efficiency at the desired resonance frequency f0 can be equal to or greater than 80% even if there is the error in the capacitance of the capacitors C1, C2 of up to ±10%. Consequently, the decrease in the transmission efficiency caused by the variation in the capacitors C1, C2 can be reduced.

Figure 12:
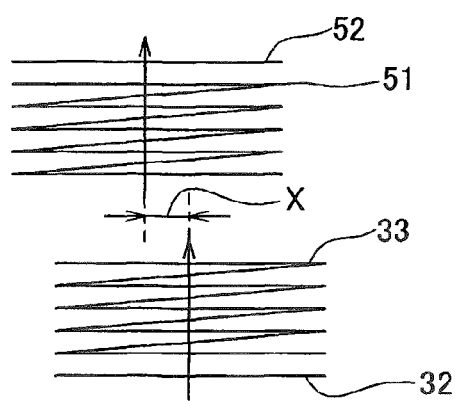
FIG. 12 illustrates positional displacement of the power supply side helical coil with respect to the power reception side helical coil.

In the embodiment described above, the number of turns N of the power supply side helical coil 33 and the power reception side helical coil 51 is between 3 turns and 6 turns. However, the number of turns N is more preferably between 3 turns and 5 turns to obtain high transmission efficiency in a wide range. This is also preferable for the positional displacement x between the power supply side helical coil 33 and the power reception side helical coil 51 shown in FIG. 12. As shown in FIG. 12, the positional displacement x is an amount of displacement of the center axis Z1 of the power supply side helical coil 33 with respect to the center axis Z2 of the power reception side helical coil 51.

Figure 13:
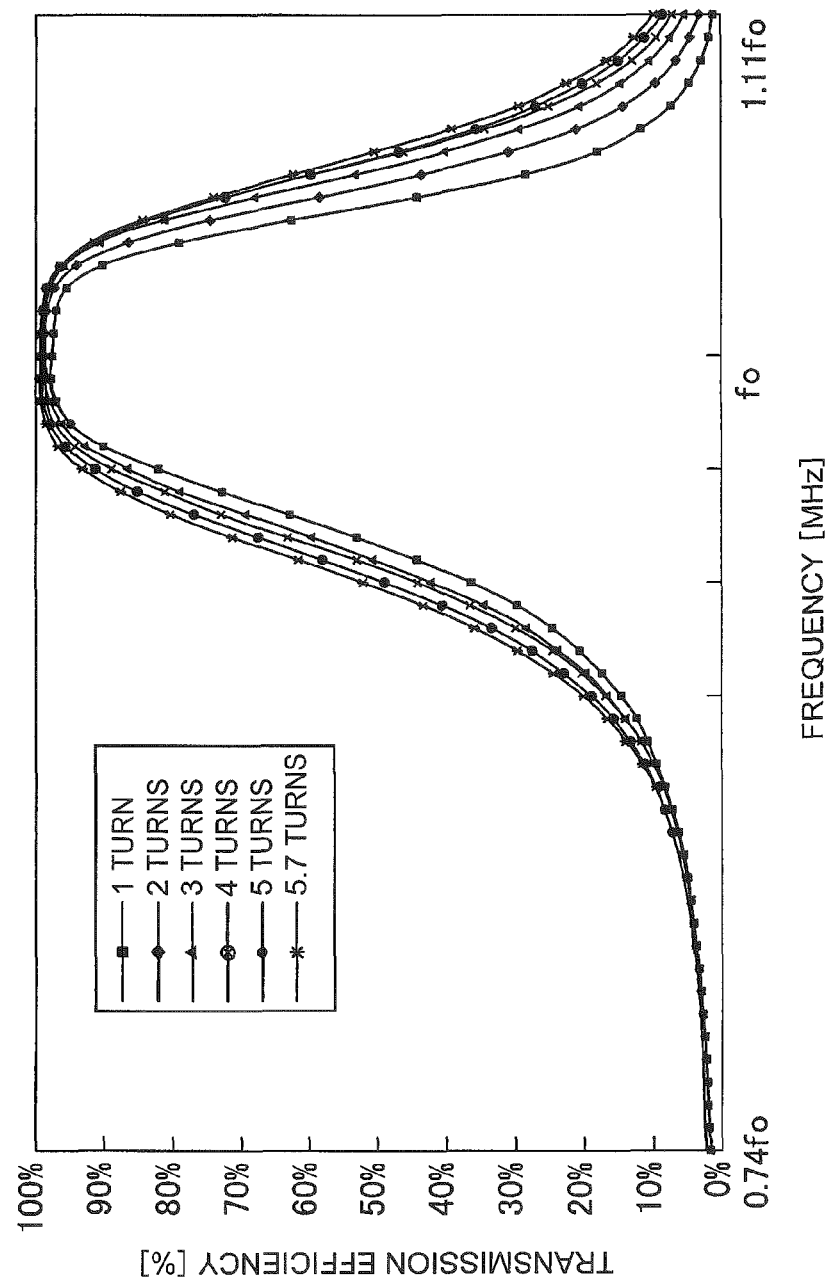
FIG. 13 is a graph showing simulation results of transmission efficiency near resonant frequency f0 when the number of turns of the power supply side helical coil and the power reception side helical coil is changed to 1 through 5.7.

To verify the effect, the inventors of the present invention had simulated the transmission efficiency at near the resonance frequency f0 when the number of turns N of the power supply side helical coil 33 and the power reception side helical coil 51 is changed from 1 turn to 5.7 turns. The results are shown in FIG. 13. It is clear from FIG. 13 that, the frequency range with the high transmission efficiency is increased with the increase in the number of turns N.

Next, to verify the effect, the inventors of the present invention had simulated the transmission efficiency at near the resonance frequency f0 for the power supply system 1 with the number of turns N of the power supply side helical coil 33 and the power reception side helical coil 51 being 1 through 8 turns, and when there is generation of the positional displacement x of 0 through 0.75D (here, D is indicative of the diameter of the power supply side helical coil 33 and the power reception side helical coil 51). The results are shown in FIG. 14.

Figure 14:
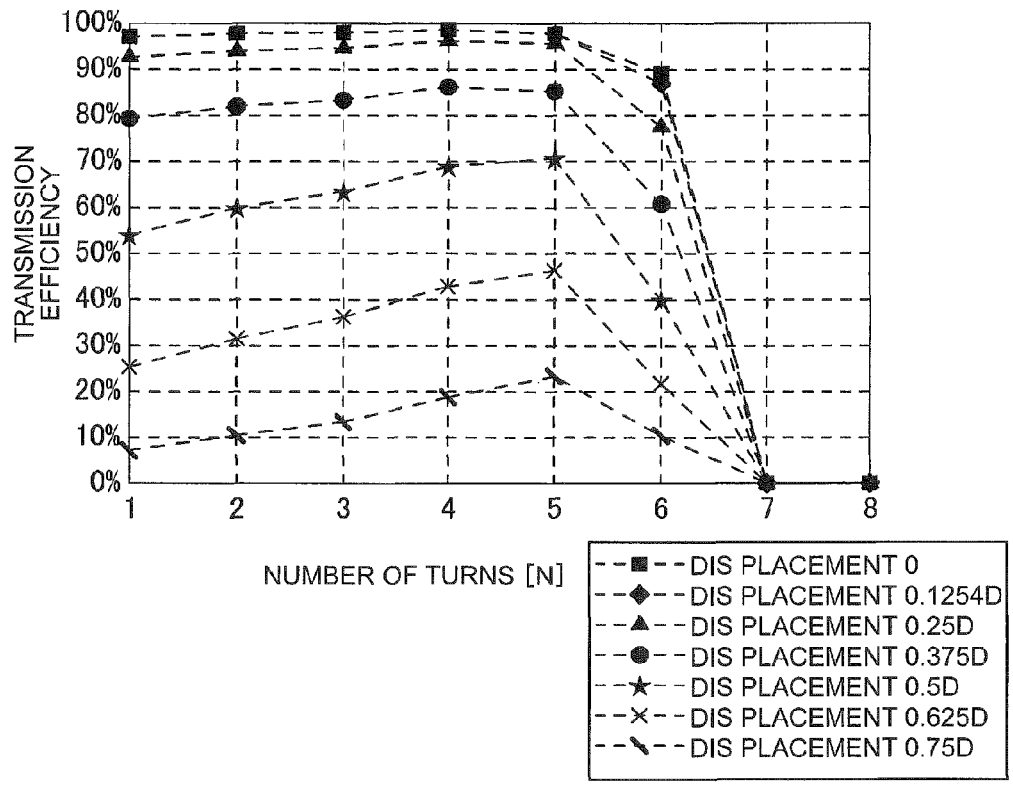
FIG. 14 is a graph showing simulation results of transmission efficiency near resonant frequency f0 for the power supply system when the positional displacement x is 0 through 0.75D, in which the number of turns of the power supply side helical coil and the power reception side helical coil is changed to 1 through 8.
Figure 15:
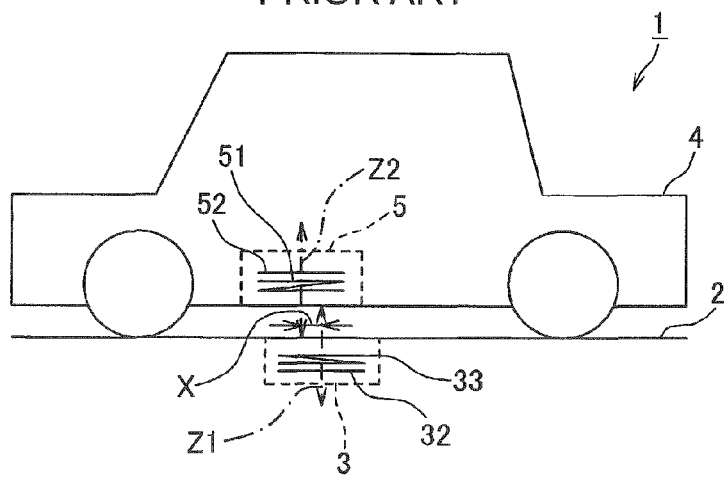
FIG. 15 shows a conventional power supply system.
Figure 16:
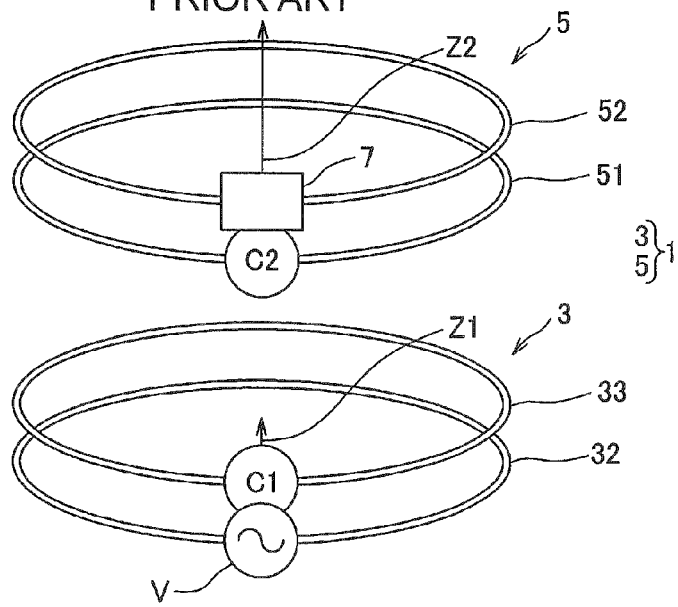
FIG. 16 shows a conventional power supply system.

It is clear from FIG. 14 that, the decrease in the transmission efficiency caused by the positional displacement x can be reduced with the increase in the number of turns N compared to the conventional product with the number of turns N=1. However, when the number of turns is more than N=6, the resonance frequency f0 is changed, thus the transmission efficiency is decreased significantly.

Furthermore, it is clear from FIG. 14 that, when the number of turns N of the power supply side helical coil 33 and the power reception side helical coil 51 is at least 3 turns but no more than 5 turns, the transmission efficiency at the resonance frequency f0 can be equal to or greater than 60%, even if there is the positional displacement x of 0.5D.

According to the embodiment described above, the power supply side helical coil 33 and the power reception side helical coil 51 are wound into a circular shape; however, the present invention is not limited to this. The shape of the power supply side helical coil 33 and the power reception side helical coil 51 may be other than circle and may be rectangular or triangular shape.

The embodiments described herein are only representative embodiment of the present invention, and the present invention is not limited to these. That is, the present invention can be modified in various ways and implemented without departing from the gist of the present invention.

REFERENCE SIGN LIST 1 power supply system
3 power supply part (power supply unit)
5 power reception part (power reception unit)
33 power supply side helical coil (power supply side coil)
51 power reception side helical coil (power reception side coil)
C1 capacitor
C2 capacitor

The invention claimed is:

1. A power supply system comprising:
a power supply unit including a power supply side coil to which electric power is supplied; and
a power reception unit including a power reception side coil arranged to electromagnetically resonate with the power supply side coil and receive the electric power from the power supply side coil,
wherein impedances of the power supply unit and the power reception unit are matched at a position where a center axis of the power supply side coil is displaced with respect to a center axis of the power reception side coil,
wherein impedances of the power supply unit and the power reception unit are not matched at a position where the center axis of the power supply side coil is coincident with the center axis of the power reception side coil, and
wherein the impedances of the power supply unit and the power reception unit are matched when the displacement of the center axes of the power supply side coil and the power reception side coil is within a range of 0.0625D to 0.375D, where D is a diameter of the power supply side coil and the power reception side coil.

2. The power supply system according to claim 1, wherein the power supply side coil and the power reception side coil are wound into a circular shape.

* * * * *